US00RE48804E

(19) United States
(12) Reissued Patent
Hsu

(10) Patent Number: US RE48,804 E
(45) Date of Reissued Patent: Nov. 2, 2021

(54) CUTTING TOOL

(71) Applicant: Yuan-Chi Hsu, New Taipei (TW)

(72) Inventor: Yuan-Chi Hsu, New Taipei (TW)

(21) Appl. No.: 16/690,129

(22) Filed: Nov. 21, 2019

Related U.S. Patent Documents

Reissue of:
(64) Patent No.: 9,969,097
Issued: May 15, 2018
Appl. No.: 14/822,895
Filed: Aug. 10, 2015

(30) Foreign Application Priority Data

Sep. 29, 2014 (CN) ..... 201420569187.2

(51) Int. Cl.
*B26D 7/26* (2006.01)
*B26D 7/01* (2006.01)
*B26D 1/04* (2006.01)
*B26D 5/08* (2006.01)

(52) U.S. Cl.
CPC ..... *B26D 7/015* (2013.01); *B26D 1/045* (2013.01); *B26D 5/08* (2013.01)

(58) Field of Classification Search
CPC ..... B26D 7/015; B26D 5/08; B26D 1/045; B21D 45/006; Y10T 83/2159; Y10T 83/8696
See application file for complete search history.

(56) References Cited

U.S. PATENT DOCUMENTS 3,269,240 A * 8/1966 Killaly ..... B21D 28/34 83/140
4,031,616 A 6/1977 Hines
5,094,134 A * 3/1992 Mizukoshi ..... B26D 7/2614 33/18.1
5,292,329 A * 3/1994 Werner ..... A61B 17/3211 30/162
6,505,385 B2 * 1/2003 Grunberger ..... A44B 11/2592 24/303
6,684,514 B2 * 2/2004 Welch ..... B23B 47/287 30/366
7,806,309 B2 * 10/2010 Korchmar ..... A45C 3/06 224/183
7,930,958 B2 * 4/2011 Workman ..... B26D 7/2628 30/161

(Continued)

FOREIGN PATENT DOCUMENTS

CN 101284381 A 10/2008
JP S58-138633 A 8/1983

(Continued)

*Primary Examiner* — Catherine S Williams
(74) *Attorney, Agent, or Firm* — Winston Hsu

(57) ABSTRACT

A cutting tool includes a pipe, a pressing foot assembly, a spring, and a blade assembly. The pressing foot assembly is slidably sheathed on an end of the pipe. The spring is sheathed on the pipe. An end of the spring abuts against the pipe, and the other end of the spring abuts against the pressing foot assembly. The blade assembly passes through the pipe and the pressing foot assembly in a slidable manner. When the cutting tool moves along a first direction, the pressing foot assembly keeps pressing against an object in a second direction substantially perpendicular to the first direction, such that the blade assembly protrudes from the pressing foot assembly and cuts the object along the first direction.

11 Claims, 7 Drawing Sheets

(56) References Cited

U.S. PATENT DOCUMENTS

| | | | | |
|---|---|---|---|---|
| 2009/0266209 | A1* | 10/2009 | Thielges | B21D 28/346<br>83/140 |
| 2011/0280999 | A1* | 11/2011 | Crystal | A21C 15/002<br>426/231 |
| 2014/0165808 | A1* | 6/2014 | Fujihara | B26F 1/3813<br>83/284 |
| 2015/0273718 | A1* | 10/2015 | Yu | B26D 7/2628<br>83/698.31 |

FOREIGN PATENT DOCUMENTS

| | | | |
|---|---|---|---|
| JP | H04156846 | | 5/1992 |
| JP | H04156846 | A | 5/1992 |
| JP | H06-23694 | A | 2/1994 |
| JP | H06-39388 | | 5/1994 |
| JP | H0639388 | | 5/1994 |
| JP | H0639388 | U | 5/1994 |
| JP | H08-71980 | | 3/1996 |
| JP | H0871980 | A | 3/1996 |
| JP | 2006-346785 | A | 12/2006 |
| JP | 2007-160422 | A | 6/2007 |
| JP | 2013-193193 | | 9/2013 |
| JP | 2013193193 | A | 9/2013 |
| TW | 583076 | | 4/2004 |

* cited by examiner

CUTTING TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a cutting tool without being driven to swing up and down by a motor, and more particularly, to a cutting tool for cutting a corrugated sheet or a solid sheet.

2. Description of the Prior Art

A conventional cutting tool includes a body coupled to a motor, a socket, and a blade. The blade is fixed on an end of the body. The conventional cutting tool is assembled on a computer-aided manufacturing (CAM) machine and is driven to swing up and down vertically and move horizontally by the motor for cutting a sheet, such as a corrugated sheet or a solid sheet. Swinging amplitude of the conventional cutting tool driven by the motor is designed according to number of manufactured short fibers of the sheet. When it is desired to cut a corrugated sheet with numerous manufactured short fibers, it sets the larger swinging amplitude of the conventional cutting tool, so as to achieve a better cutting effect. However, it reduces a cutting speed of the conventional cutting tool. On the other hand, when it sets the smaller swinging amplitude to increase the cutting speed, the cutting effect gets worse. That is, the corrugated sheet may be torn due to cutting incompletion caused by the insufficient swinging amplitude or the excessive cutting speed of the conventional cutting tool. For example, when it is desired to cut a corrugated sheet with much more manufactured short fibers, it has to set the much larger swinging amplitude of the conventional cutting tool for a better cutting effect. Otherwise, the blade cannot cut the corrugated sheet effectively, and the corrugated sheet may get torn. Therefore, when it is desired to cut a corrugated sheet with numerous manufactured short fibers, it needs to increase the swinging amplitude of the conventional cutting tool to ensure an enhanced cutting effect. However, it reduces the cutting speed.

Furthermore, when it is desired to cut a solid sheet, the conventional cutting tool moves horizontally within a working area in the X-Y plane, the socket departs from the solid sheet instead of pressing the solid sheet all the time when the conventional cutting tool moves along a cutting path. The socket will slightly press the solid sheet only when the conventional cutting tool moves downwardly to cut the solid sheet. That is, the socket will move up and down repeatedly when the conventional cutting tool moves along the cutting path, which causes the solid sheet to be incapable of being effectively and stably pressed on a desktop or a working platform by the socket. Therefore, when the conventional cutting tool moves along the cutting path, the solid sheet may be pulled up by the blade, which causes a through hole on the solid sheet, and small pieces split from the solid sheet cannot support each other. Furthermore, the through hole results in air communication, so that a suction force generated by an air compressor is too weak to maintain a vacuum status for sucking the solid sheet effectively, which makes the solid sheet torn due to cutting incompletion and fails to cut the solid sheet precisely and smoothly.

Therefore, there is a need to design a cutting tool to increase cutting speed when cutting a corrugated sheet and to enhance cutting precision when cutting a solid sheet.

SUMMARY OF THE INVENTION

In order to solve the drawbacks as mentioned above, the present invention provides a cutting tool without being driven to swing up and down by a motor, which allows a CAM machine to maximize a cutting speed to 100 percent of a design cutting speed when cutting a corrugated sheet, and achieves a precise cutting effect and a smooth cutting process when cutting a solid sheet.

According to the claimed invention, a cutting tool includes a pipe, a pressing foot assembly, a spring, and a blade assembly. The pressing foot assembly is slidably sheathed on an end of the pipe in a slidable manner. An opening is formed on an end of the pressing foot assembly away from the pipe. The spring is sheathed on the pipe. An end of the spring abuts against the pipe, and the other end of the pipe abuts against the pressing foot assembly. The blade assembly passes through the pipe and the pressing foot assembly in a slidable manner. The blade assembly includes an adjusting rod, a blade holder, and a blade. The adjusting rod passes through the pipe. An end of the blade holder is combined with an end of the adjusting rod. The blade is fixed on the other end of the blade holder. When the cutting tool moves along a first direction, the pipe drives the pressing foot assembly to keep pressing against an object in a second direction substantially perpendicular to the first direction, such that the blade protrudes from the opening and cuts the object during a process that the pressing foot assembly keeps pressing against the object along the second direction.

According to the claimed invention, the pressing foot assembly includes an adapter ring and a pressing foot. The adapter ring abuts against the spring. The opening is formed on the pressing foot, and the pressing foot detachably combines with the adapter ring.

According to the claimed invention, the pressing foot assembly further includes a first magnetic member and a second magnetic member. The pressing foot includes a combining end and a free end. A first assembling hole is formed on the adapter ring. The first magnetic member is fixed inside the first assembling hole. A second assembling hole is formed on the assembling end of the pressing foot and corresponding to the first assembling hole. The second magnetic member is fixed inside the second assembling hole, and the first magnetic member and the second magnetic member attract with each other, such that the combining end of the pressing foot is detachably combined with the adapter ring.

According to the claimed invention, the pressing foot assembly further includes a register pin and a register hole. The register hole is formed on one of the adapter ring and the pressing foot. The register pin is disposed on the other one of the adapter ring and the pressing foot, and the register pin engages with the register hole, such that a direction of the opening is parallel to a direction of the blade.

According to the claimed invention, a protrusion is formed on the free end of the pressing foot, and the opening is formed on the protrusion.

According to the claimed invention, the protrusion is an arc protrusion.

According to the claimed invention, a flat portion is formed on the free end of the pressing foot, and the opening is formed on the flat portion.

According to the claimed invention, a sliding slot is formed on the pipe. The pressing foot assembly further includes a sliding block disposed on a location corresponding to the sliding slot. When the pipe moves along the second direction, the sliding slot cooperates with the sliding block to guide the pressing foot assembly to slide along the second direction relative to the pipe, such that the spring is compressed by the pipe and the pressing foot assembly.

According to the claimed invention, the sliding block is a screw member. A screw hole is formed on a location of the pressing foot assembly corresponding to the sliding slot, and the screw member is screwed in the screw hole and accommodated in the sliding slot.

According to the claimed invention, the object is a corrugated sheet with wave-shaped core layers or a solid sheet According to the claimed invention, a thread structure is formed on the end of the adjusting rod where the blade holder is combined, and the thread structure is combined with the blade holder, so as to adjust a length of the blade protruding from the opening.

In summary, the pressing foot assembly of the cutting tool of the present invention keeps pressing against an object by the resilient force generated from the spring during a cutting process. When cutting a corrugated sheet, the wave-shaped core layers of the corrugated sheet are collapsed by the pressing foot assembly. The collapsed corrugated sheet is similar to a plurality of overlaid solid sheets, which allows the cutting tool to cut the collapsed corrugated sheet with a maximum cutting speed. In other words, since it is not required to drive the cutting tool to swing up and down by a motor anymore, a computer-aided manufacturing (CAM) machine can maximize a cutting speed to 100 percent of a design cutting speed when cutting the corrugated sheet without considering relations between the swinging amplitude of the cutting tool, properties of the corrugated sheet, and a horizontal moving speed of the cutting tool relative to the corrugated sheet. Furthermore, when cutting a solid sheet, it prevents the solid sheet from being pulled up by the blade, such that a through hole is prevented from being formed on the solid sheet, which allows the solid sheet to be fixed on a working platform stably and ensures a precise cutting effect. Besides, the present invention further utilizes the first magnetic members and the second magnetic members attracting with each other for detaching the pressing foot from the adapter ring or combining the pressing foot with the adapter ring conveniently. Therefore, when it is desired to cut another corrugated sheet with a different height or a solid sheet, it can replace the original pressing foot with another pressing foot conveniently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
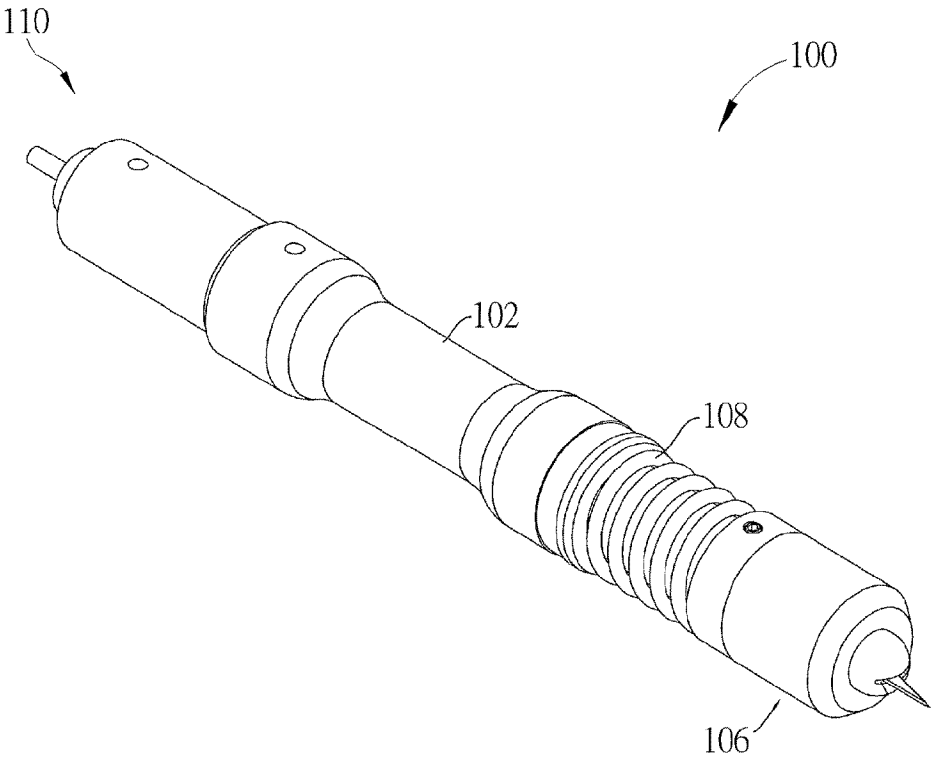
FIG. 1 is a schematic diagram of a cutting tool according to an embodiment of the present invention.
Figure 2:
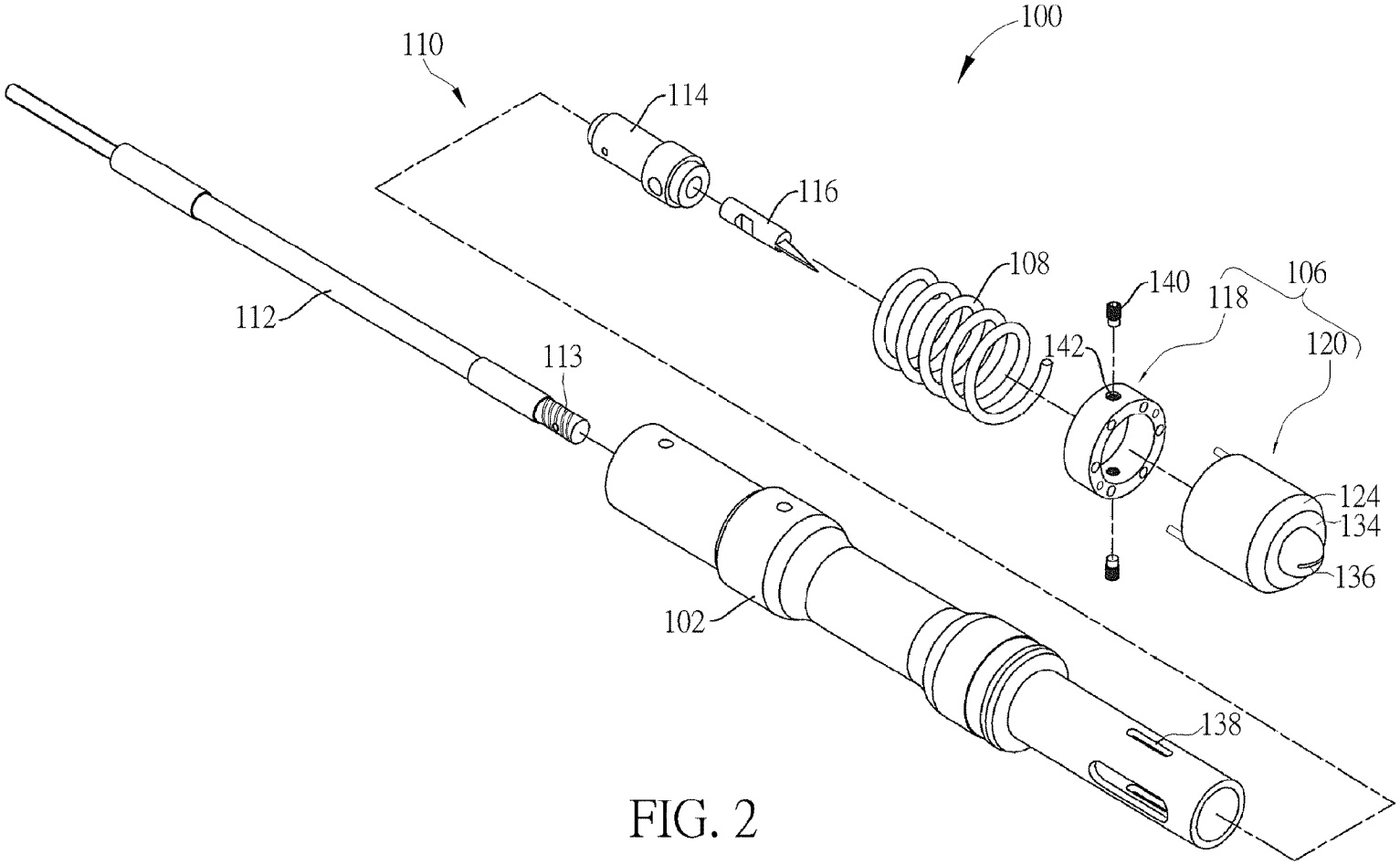
FIG. 2 is an exploded diagram of the cutting tool according to the embodiment of the present invention.

Please refer to FIG. 1 and FIG. 2. FIG. 1 is a schematic diagram of a cutting tool 100 according to an embodiment of the present invention. FIG. 2 is an exploded diagram of the cutting tool 100 according to the embodiment of the present invention. As shown in FIG. 1 and FIG. 2, the cutting tool 100 includes a pipe 102, a pressing foot assembly 106, a spring 108, and a blade assembly 110. The pressing foot assembly 106 is slidably sheathed on an end of the pipe 102. The spring 108 is sheathed on the pipe 102. An end of the spring 108 abuts against the pipe 102, and the other end of the spring 108 abuts against the pressing foot assembly 106. In this embodiment, the spring 108 can be a spring. The blade assembly 110 passes through the pipe 102 and the pressing foot assembly 106 in a slidable manner. The blade assembly 110 includes an adjusting rod 112, a blade holder 114, and a blade 116. The adjusting rod 112 passes through the pipe 102. An end of the blade holder 114 is fixed on an end of the adjusting rod 112. The blade 116 is fixed on the other end of the blade holder 114. In this embodiment, a thread structure 113 is formed on the end of the adjusting rod 112. The thread structure 113 is combined with the blade holder 114 for adjusting a length of the blade 116 protruding from an opening 136 formed on the pressing foot assembly 106.

Figure 3:
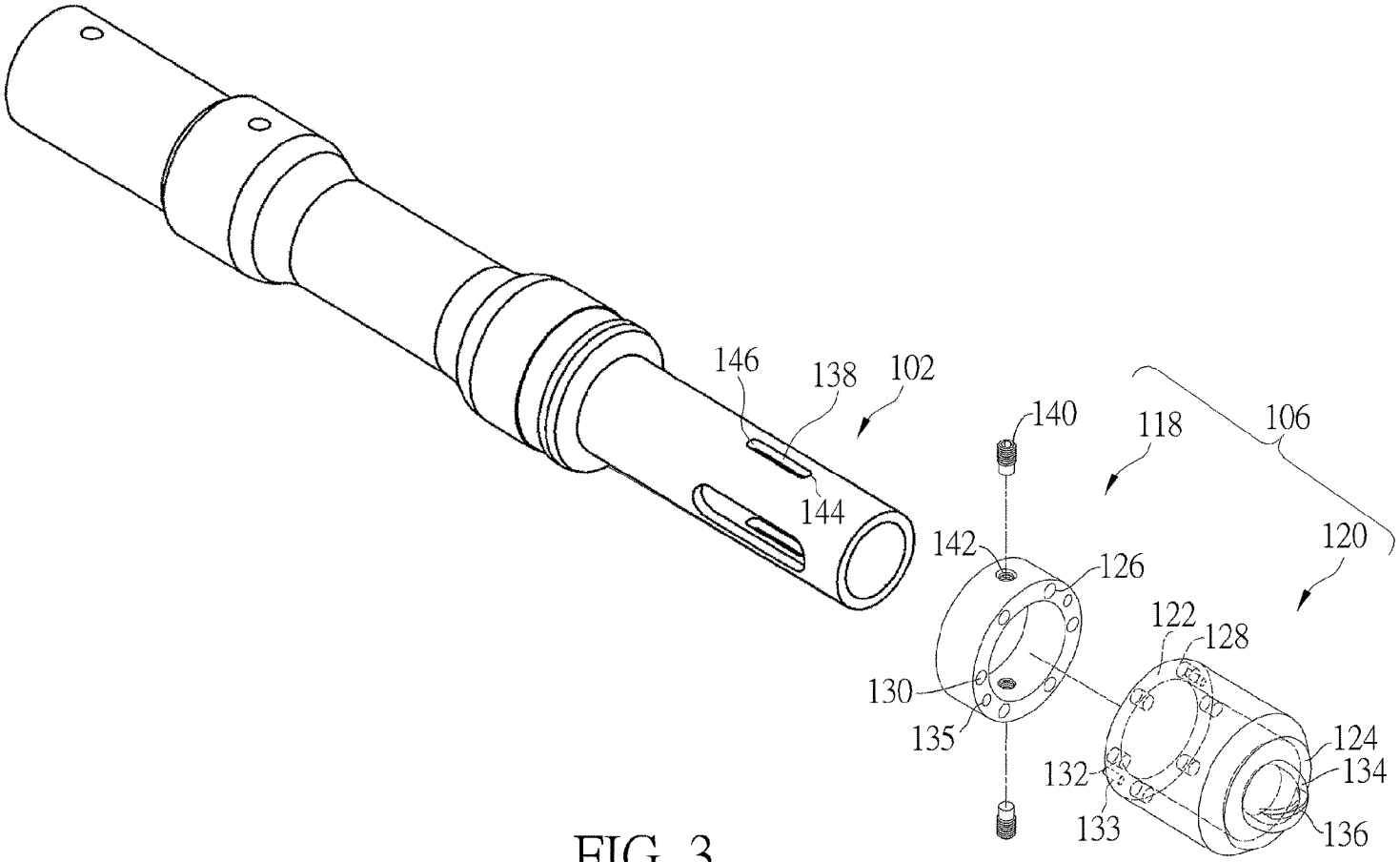
FIG. 3 is a partial exploded diagram of a pipe and a pressing foot assembly of the cutting tool according to the embodiment of the present invention.

Please refer to FIG. 2 and FIG. 3. FIG. 3 is a partial exploded diagram of the pipe 102 and the pressing foot assembly 106 of the cutting tool 100 according to the embodiment of the present invention. As shown in FIG. 2 and FIG. 3, the pressing foot assembly 106 includes an adapter ring 118 and a pressing foot 120. The adapter ring 118 abuts against the spring 108. The pressing foot 120 is detachably combined with the adapter ring 118. Specifically, the pressing foot 120 includes a combining end 122 and a free end 124. At least first assembling hole 126 is formed on the adapter ring 118. At least one second assembling hole 128 is formed on the combining end 122 of the pressing foot 120 and corresponding to the at least one first assembling hole 126. For example, six assembling holes 126 are formed on the adapter ring 118, and six second assembling holes 128 are formed on the combining end 122 of the pressing foot 120 and corresponding to the six first assembling holes 126, in this embodiment. The pressing foot assembly 106 further includes at least one first magnetic member 130 and at least one second magnetic member 132. For example, the six first magnetic members 130 are fixed inside the six first assembling holes 126, and the six second magnetic members 132 are fixed inside the six second assembling holes 128. However, the numbers of the first assembling hole 126, the second assembling hole 128, the first magnetic member 130, and the second magnetic member 132 are not limited to this embodiment. The first magnetic members 130 and the second magnetic members 132 attract with each other, such that the combining end 122 of the pressing foot 120 is detachably combined with the adapter ring 118, which brings convenience in replacing the pressing foot 120.

However, a combining mechanism of the pressing foot 120 and the adapter ring 118 is not limited to this embodiment. For example, the pressing foot 120 can be combined with the adapter ring 118 by a screwing manner. Furthermore, the pressing foot assembly 106 further includes a register pin 133 and a register hole 135. The register hole 135 is formed on one of the adapter ring 118 and the pressing foot 120. The register pin 133 is disposed on the other one of the adapter ring 118 and the pressing foot 120. In this embodiment, the register hole 135 is formed on an end of the adapter ring 118 close to the pressing foot 120. The register pin 133 is disposed on an end of the pressing foot 120 close to the adapter ring 118 and protrudes from the combining end 122. The register pin 133 engages with the register hole 135, such that a direction of the opening 136 is parallel to a direction of the blade 116.

Figure 4:
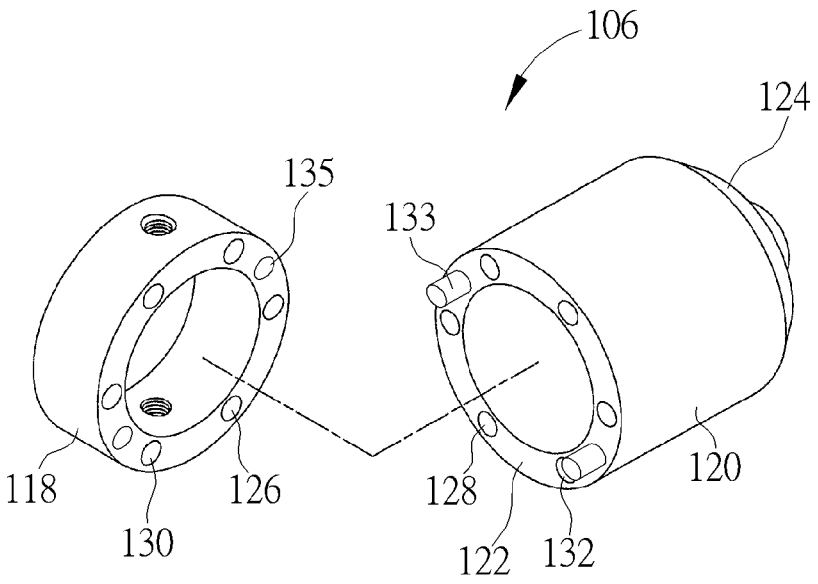
FIG. 4 is a partial exploded diagram of the pressing foot assembly of the cutting tool according to the embodiment of the present invention.
Figure 5:
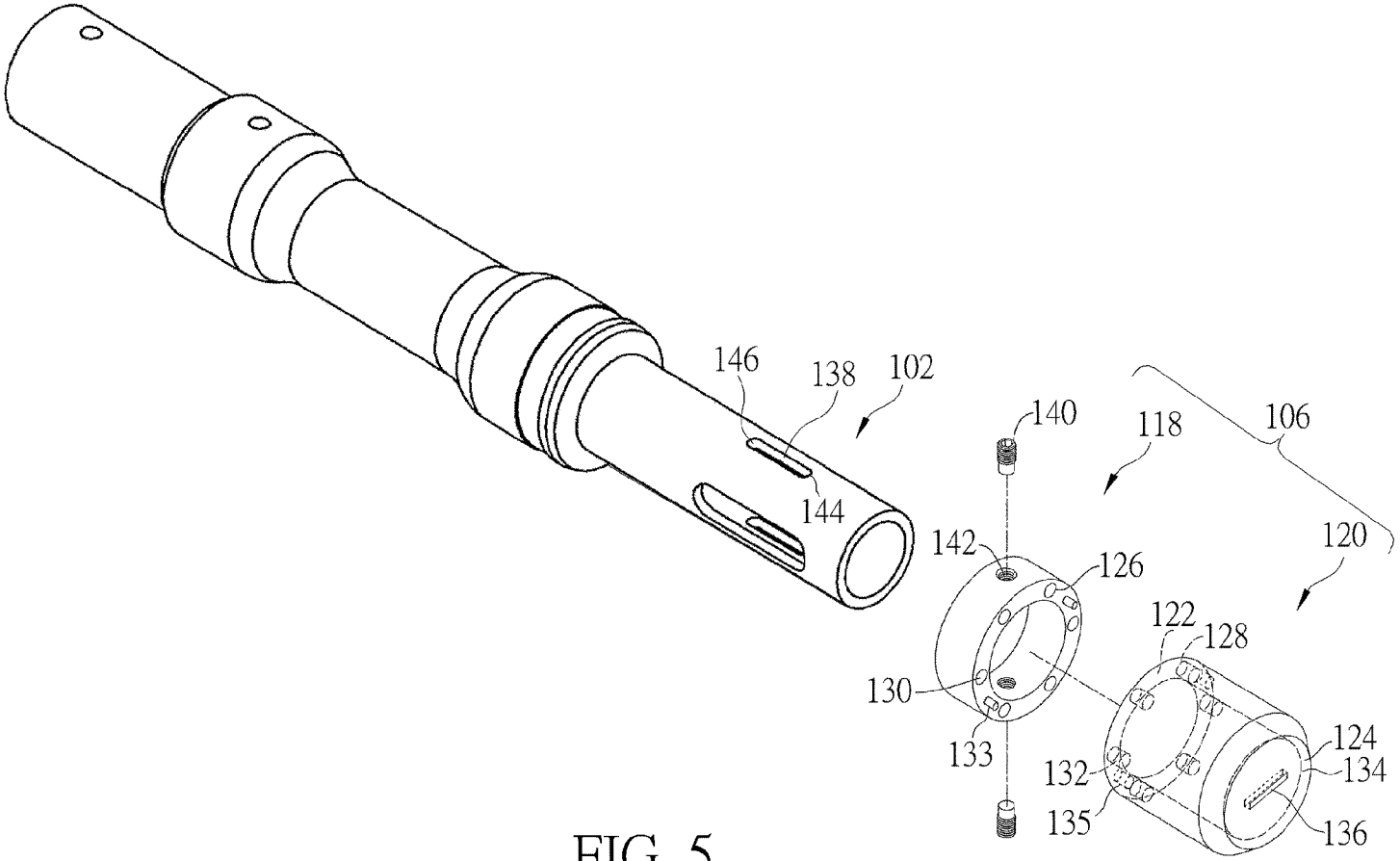
FIG. 5 is a partial exploded diagram of a pipe and a pressing foot assembly of a cutting tool according to another embodiment of the present invention.

Please refer to FIG. 3 and FIG. 4. FIG. 4 is a partial exploded diagram of the pressing foot assembly 106 of the cutting tool 100 according to the embodiment of the present invention. As shown in FIG. 3 and FIG. 4, in this embodiment, a protrusion 134 is formed on the free end 124 of the pressing foot 120, and the opening 136 is formed on the protrusion 134. Furthermore, the protrusion 134 can be an arc protrusion. Please refer to FIG. 5. FIG. 5 is a partial exploded diagram of the pipe 102 and the pressing foot assembly 106 of the cutting tool 100 according to another embodiment of the present invention. Different from the cutting tool 100 in aforementioned embodiment, instead of the arc protrusion, a flat portion is formed on the free end 124 of the pressing foot 120, and the opening 136 is formed on the flat portion. That is, a shape of the free end 124 of the pressing foot 120 is not limited to the aforementioned embodiments. It depends on practical design demands. In other words, the free end 124 of the pressing foot 120 of the present invention can be designed as a structure with a different arc shape according to a height or a property of wave-shaped core layers of an object. For example, when it is desired to cut a thicker object, such as a corrugated sheet, the free end 124 of the pressing foot 120 with the arc protrusion can be utilized for pressing against the thicker object. When it is desired to cut a thinner object, such as a solid sheet, the free end 124 of the pressing foot 120 with the flat portion can be utilized for pressing the thinner object. Furthermore, since the pressing foot 120 is detachably combined with the adapter ring 118 by the first magnetic members 130 and the second magnetic members 132 attracting with each other, it is easy to detach the original pressing foot 120 from the adapter ring 118 and combine another pressing foot 120 with the adapter ring 118 for cutting another object with a different height, so as to complete replacement of the pressing foot 120 conveniently. Besides, as shown in FIG. 5, in this embodiment, the register pin 133 is disposed on the end of the adapter ring 118 close to the pressing foot 120. The register hole 135 is formed on the end of the pressing foot 120 close to the adapter ring 118.

As shown in FIG. 2 and FIG. 3, a sliding slot 138 is formed on the pipe 102. The pressing foot assembly 106 further includes a sliding block 140 disposed on a location corresponding to the sliding slot 138. The sliding slot 138 cooperates with the sliding block 140 for guiding the pressing foot assembly 106 to slide relative to the pipe 102, such that the spring 108 is compressed by the pipe 102 and the pressing foot assembly 106. Specifically, in this embodiment, the sliding block 140 can be a screw member. Furthermore, a screw hole 142 is formed on the adapter ring 118 of the pressing foot assembly 106 and corresponding to the sliding slot 138. The screw member is screwed in the screw hole 142 and accommodated in the sliding slot 138. The sliding slot 138 has a first end 144 and a second end 146. The screw member can slide back and forth between the first end 144 and the second end 146 of the sliding slot 138. However, the configuration and the number of the sliding slot 138 and the sliding block 140 are not limited to the aforementioned embodiment. It depends on practical design demands.

Figure 6:
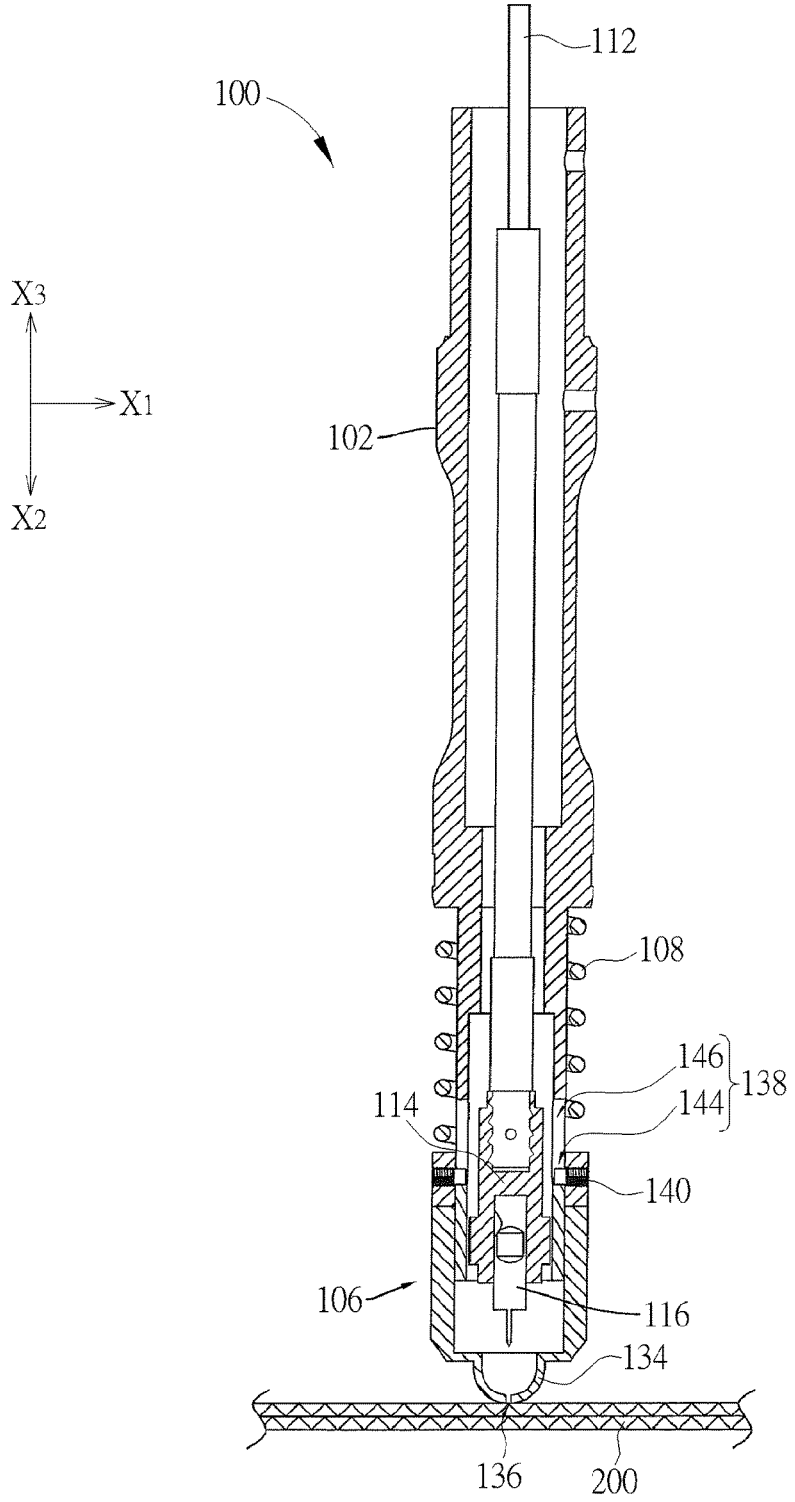
FIG. 6 and FIG. 7 are sectional diagrams of the cutting tool at different positions according to the embodiment of the present invention.
Figure 7:
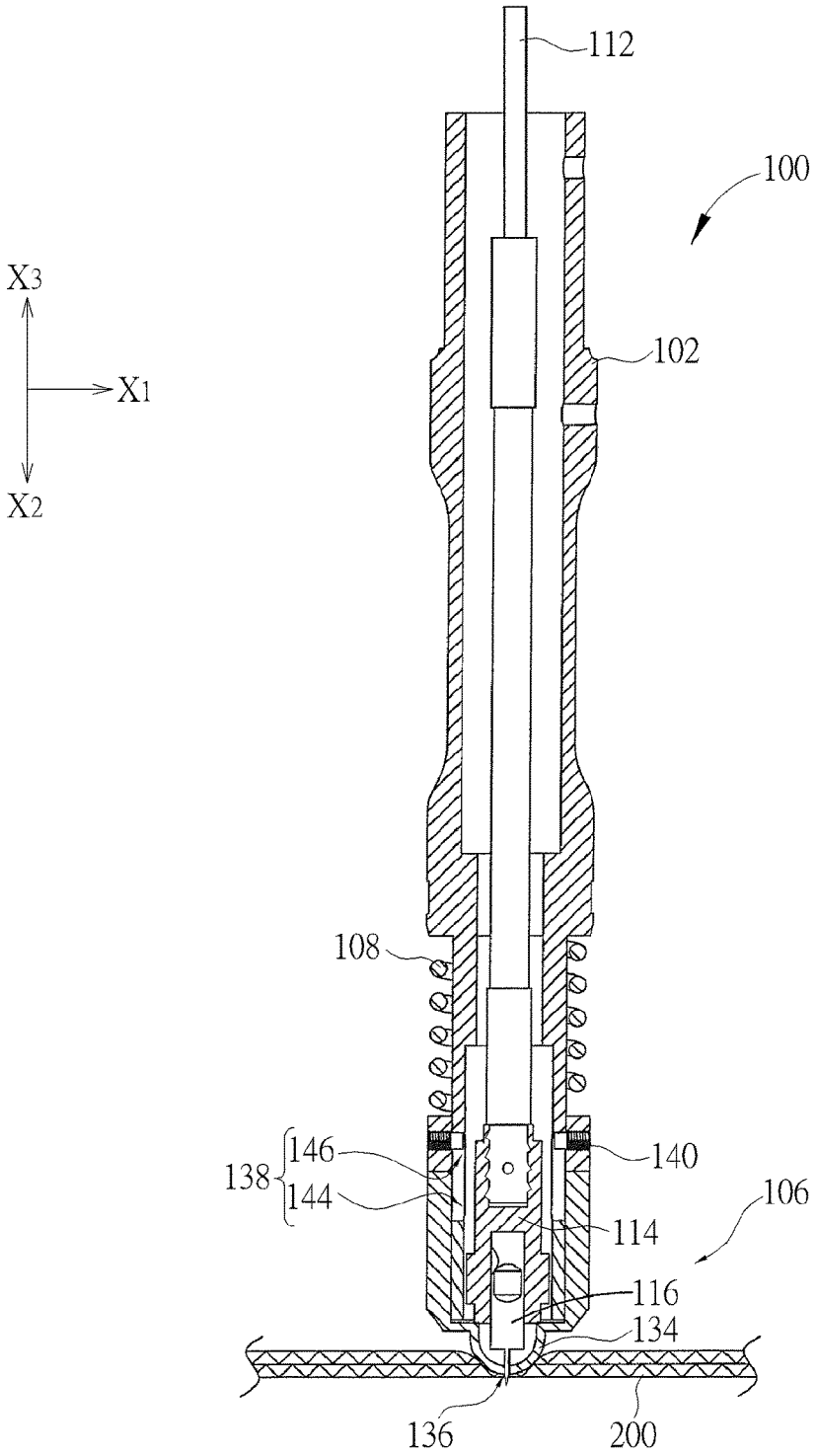

Operational principle of the cutting tool 100 according to the embodiment of the present invention is described as follows. Please refer to FIG. 6 and FIG. 7. FIG. 6 and FIG. 7 are sectional diagrams of the cutting tool 100 at different positions according to the embodiment of the present invention. As shown in FIG. 6, the sliding block 140 is located at the first end 144 of the sliding slot 138, and the blade 116 is received in the pressing foot assembly 106. As shown in FIG. 7, when it is desired to cut an object 200, such as a corrugated sheet with wave-shaped core layers, along a first direction X1, the pipe 102 drives the protrusion 134 of the pressing foot assembly 106 to keep pressing against the object 200 along a second direction X2 substantially perpendicular to the first direction X1, such that the sliding block 140 slides to the second end 146 of the sliding slot 138. In the meantime, the spring 108 is compressed for providing a buffering effect, and the blade 116 protrudes from the opening 136 and moves along the first direction X1, such that the blade 116 cuts the object 200 along the first direction X1 during a process that the protrusion 134 of the pressing foot assembly 106 keeps pressing against the object 200 along the second direction X2.

It should be noted that when the object 200 is a corrugated sheet with wave-shaped core layers, the cutting tool 100 can utilize the free end 124 of the pressing foot 120 with the arc protrusion and the spring 108 with a higher elasticity coefficient (K) for pressing against the corrugated sheet. Since the spring 108 with the higher elasticity coefficient can provide a larger resilient recovering force during a process that the pressing foot assembly 106 keeps pressing against the corrugated sheet, the pressing foot 120 with the arc protrusion collapses the wave-shaped core layers, so that the corrugated sheet can be considered as a plurality of overlaid solid sheets. Therefore, the pressing foot 120 presses against the corrugated sheet and the blade 116 cuts the corrugated sheet along a cutting path at the same time, which allows a computer-aided manufacturing (CAM) machine to process a cutting operation in a maximum cutting speed and improves a cutting effect of the corrugated sheet. Furthermore, the blade assembly 110 of the present invention can be a tangential knife tool instead of an oscillating knife tool, which allows the cutting tool 100 to execute an effective cutting operation in the maximum cutting speed of the CAM machine and improves an overall cutting performance. Besides, after the blade 116 finishes a cutting process that the blade 116 moves along the first direction X1 by a specific distance, the blade 116 is to move to the next cutting point and execute the cutting operation as mentioned above. During a process that the blade 116 moves to the next cutting point, the pipe 102 moves along a third direction X3 opposite to the second direction X2, such that the protrusion 134 separates from the corrugated sheet. At this moment, the blade 116 is received in the pressing foot assembly 106 again, which prevents other portions of the corrugated sheet from being crushed by the protrusion 134 or the blade 116. Furthermore, structural design of a corrugated box is normally based on a thickness of a collapsed edge of a corrugated sheet. In the prior art, a corrugated sheet is cut without being collapsed. Therefore, it is still required to collapse an engaging portion of a corrugated sheet by hands or other tools for being inserted into a corresponding slot in the prior art. In the present invention, since an engaging portion of a corrugated sheet has already been collapsed by the pressing foot 120, it is not required to process the conventional and additional collapsing operation as mentioned above.

On the other hand, when the object 200 is a solid sheet, the cutting tool 100 can utilize the free end 124 of the pressing foot 120 with the flat portion and the spring 108 with lower elasticity coefficient because the solid sheet cannot be collapsed like the corrugated sheet with wave-shaped core layers. When the blade 116 moves up and down along a Z axis, i.e., the second direction X2 or the third direction X3, and moves along the first direction X1 in an X-Y plane to cut the solid sheet, the pressing foot 120 does not depart from the solid sheet by the resilient recovering force generated from the spring 108, such that the pressing foot 120 can flat a cutting trace on the solid sheet and make sure that flatness of the cut solid sheet is similar to flatness of the uncut solid sheet. However, in the prior art, a gap or a through hole is formed on a solid sheet because of a thickness of a conventional blade, which results in air communication and reduces a sucking ability of an air compressor. Therefore, the solid sheet cannot be fixed stably on a desktop or a working platform during a cutting process in the prior art. When it is desired to cut a precise pattern, a gap or a through hole results in air communication and a solid sheet cannot be fixed stably, which leads the solid sheet to be torn by the blade and fails to complete the cutting process in the prior art. In the present invention, even when a solid sheet is pulled up by the blade 116, the pressing foot 120 can stop the solid paper and prevent a through hole or a gap from being formed on the solid sheet to avoid the air communication, such that the solid sheet is fixed stably. In other words, since the pressing foot 120 does not depart from the solid sheet when cutting, the pressing foot 120 flats a cutting trace and fixes the solid sheet for ensuring completeness of the solid sheet and preventing the air communication, which allows the compressor to suck the solid paper and ensures that the solid paper is fixed on a desktop or a working platform stably.

In contrast to the prior art, the pressing foot assembly of the cutting tool of the present invention keeps pressing against an object by the resilient force generated from the spring during a cutting process. When cutting a corrugated sheet, the wave-shaped core layers of the corrugated sheet are collapsed by the pressing foot assembly. The collapsed corrugated sheet is similar to a plurality of overlaid solid sheets, which allows the cutting tool to cut the collapsed corrugated sheet with a maximum cutting speed. In other words, since it is not required to drive the cutting tool to swing up and down by a motor anymore, a CAM machine can maximize a cutting speed to 100 percent of a design cutting speed when cutting the corrugated sheet without considering relations between the swinging amplitude of the cutting tool, properties of the corrugated sheet, and a horizontal moving speed of the cutting tool relative to the corrugated sheet. Furthermore, when cutting a solid sheet, it prevents the solid sheet from being pulled up by the blade, such that a through hole is prevented from being formed on the solid sheet, which allows the solid sheet to be fixed on a working platform stably and ensures a precise cutting effect. Besides, the present invention further utilizes the first magnetic members and the second magnetic members attracting with each other for detaching the pressing foot from the adapter ring or combining the pressing foot with the adapter ring conveniently. Therefore, when it is desired to cut another corrugated sheet with a different height or a solid sheet, it can replace the original pressing foot with another pressing foot conveniently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cutting tool comprising:

a pipe whereon a sliding slot is formed;

a pressing foot assembly slidably sheathed on an end of the pipe in a slidable manner, an opening formed on an end of the pressing foot assembly away from the pipe, the pressing foot assembly comprising an adapter ring, a pressing foot and a sliding block, the pressing foot being detachably combined with the adapter ring, the adapter ring being slidably connected to the pipe by the sliding block and the sliding slot, the opening being formed on the pressing foot, the sliding block being disposed on the adapter ring and located at a location corresponding to the sliding slot, the sliding block cooperating *with* the sliding slot to guide the pressing foot assembly to slide relative to the pipe along a second direction;

a spring sheathed on the pipe, an end of the spring abutting against the pipe, and the other end of the spring abutting against the adapter ring of the pressing foot assembly; and a blade assembly [passing through] *disposed on* the pipe and *for selectively being received in or protruding from* the pressing foot assembly[in a slidable manner, the blade assembly comprising:

an adjusting rod passing through the pipe;

a blade holder, an end of the blade holder combined with an end of the adjusting rod; and a blade fixed on the other end of the blade holder].

2. The cutting tool of claim 1, wherein the pressing foot assembly further comprises a first magnetic member and a second magnetic member, the pressing foot comprises a combining end and a free end, a first assembling hole is formed on the adapter ring, the first magnetic member is fixed inside the first assembling hole, a second assembling hole is formed on the assembling end of the pressing foot and corresponding to the first assembling hole, the second magnetic member is fixed inside the second assembling hole, and the first magnetic member and the second magnetic member attract with each other, such that the combining end of the pressing foot is detachably combined with the adapter ring.

3. The cutting tool of claim 2, wherein the pressing foot assembly further comprises a register pin and a register hole, the register hole is formed on one of the adapter ring and the pressing foot, the register pin is disposed on the other one of the adapter ring and the pressing foot, and the register pin engages with the register hole, such that a direction of the opening is parallel to a direction of the blade *assembly*.

4. The cutting tool of claim 2, wherein a protrusion is formed on the free end of the pressing foot, and the opening is formed on the protrusion.

5. The cutting tool of claim 4, wherein the protrusion is an arc protrusion.

6. The cutting tool of claim 2, wherein a flat portion is formed on the free end of the pressing foot, and the opening is formed on the flat portion.

7. The cutting tool of claim 1, wherein the sliding block is a screw member, a screw hole is formed on a location of the pressing foot assembly corresponding to the sliding slot, and the screw member is screwed in the screw hole and accommodated in the sliding slot.

8. The cutting tool of claim 1, wherein [the] *an* object *to be cut by the cutting tool* is a corrugated sheet with wave-shaped core layers or a solid sheet.

[9. The cutting tool of claim 1, wherein a thread structure is formed on the end of the adjusting rod where the blade holder is combined, and the thread structure is combined with the blade holder, so as to adjust a length of the blade protruding from the opening.]

10. The cutting tool of claim 1, wherein when the cutting tool moves along a first direction substantially perpendicular to the second direction, the pipe drives the pressing foot assembly to keep pressing against an object in the second direction, such that the blade *assembly* protrudes from the opening and cuts the object during a process that the pressing foot assembly keeps pressing against the object to collapse a plurality of wave-shaped core layers of the object along the second direction, and the spring generates a resilient force to drive the pressing foot assembly to collapse the plurality of wave-shaped core layers of the object before the blade *assembly* protrudes from the opening.

*11. The cutting tool of claim 1, wherein the blade assembly passes through the pipe and the pressing foot assembly in a slidable manner, and the blade assembly comprises:*

*an adjusting rod passing through the pipe;*

*a blade holder, an end of the blade holder combined with an end of the adjusting rod; and*

*a blade fixed on the other end of the blade holder.*

*12. The cutting tool of claim 11, wherein a thread structure is formed on the end of the adjusting rod where the blade holder is combined, and the thread structure is combined with the blade holder, so as to adjust a length of the blade protruding from the opening.*

* * * * *